May 24, 1960

M. M. LEVY 2,937,739

CONVEYOR SYSTEM

Filed April 12, 1955

INVENTOR
Maurice Moise Levy
BY
Bailey, Stephens and Huettig
Attorneys

May 24, 1960    M. M. LEVY    2,937,739
CONVEYOR SYSTEM
Filed April 12, 1955    8 Sheets-Sheet 2

INVENTOR
Maurice Moise Levy
BY
Bailey, Stephens and Huttig
Attorneys

May 24, 1960     M. M. LEVY     2,937,739
CONVEYOR SYSTEM Filed April 12, 1955     8 Sheets-Sheet 3

INVENTOR
Maurice Moise Levy
BY
Bailey, Stephens and Huttly
ATTORNEYS

May 24, 1960

M. M. LEVY 2,937,739

CONVEYOR SYSTEM

Filed April 12, 1955

INVENTOR
Maurice Noise Levy
BY
Bailey, Stephens and Huttig
Attorneys

May 24, 1960  M. M. LEVY  2,937,739
CONVEYOR SYSTEM
Filed April 12, 1955  8 Sheets-Sheet 5

INVENTOR
Maurice Moise Levy
BY
Bailey, Stephens and Huettig
ATTORNEYS

May 24, 1960  M. M. LEVY  2,937,739
CONVEYOR SYSTEM

Filed April 12, 1955  8 Sheets-Sheet 8

Fig. 19

INVENTOR
Maurice Moise Levy
BY
Bailey, Stephens and Huettig
ATTORNEYS

United States Patent Office 2,937,739
Patented May 24, 1960

2,937,739
CONVEYOR SYSTEM

Maurice Moise Levy, Ottawa, Ontario, Canada, assignor to Her Majesty the Queen in the Right of Canada as represented by the Postmaster General Filed Apr. 12, 1955, Ser. No. 500,942

Claims priority, application Canada May 27, 1954

4 Claims. (Cl. 198—38)

This invention relates to a new and improved conveyor system which is especially useful in connection with letter-mail sorting systems.

In the sorting of letter-mail it is desirable to have automatic means for diverting given letters from a conveyor at given positions along the conveyor. In order that this might be effected accurately it is necessary that the letters be carried by the conveyor at regularly spaced intervals. While it is possible to deposit letters on a simple, constant-speed conveyor belt at regular intervals, this method of spacing the letters along a conveyor is by no means fool-proof.

It is, therefore, an object of the present invention to provide a conveyor system in which the articles carried by a conveyor are automatically retained at spaced intervals along the conveyor by the action of the conveyor itself.

It is also an object of the present invention to provide a conveyor system in which articles may be automatically dropped from the conveyor at pre-determined positions along the length of a conveyor.

A further object of the present invention is to provide such a conveyor system in which articles may be automatically channelled from one conveyor to any one of a number of other conveyors.

Yet a further object of the present invention is to provide such a conveyor system in which the automatic dropping or channelling of the articles from a conveyor may be controlled by pattern codes imposed on the articles themselves.

According to the present invention, a conveyor system comprises an endless conveyor, a number of pusher members secured to the outer surface of said conveyor substantially perpendicular thereto at regularly spaced intervals therealong, and a number of parallel elongated members parallel and opposed to and substantially equidistant from said outer surface of said conveyor, said members being spaced apart one from the other and adapted to receive the free ends of said pusher members therebetween, means to drive said conveyor, and means for retaining articles between said belt and said elongated members.

In the preferred forms of the present invention a conveyor may be adapted to propel articles such as letters lying flat or standing on edge. When a conveyor is adapted for propelling letters lying flat said means for retaining articles between said belt and said elongated members comprises said elongated members themselves and two side guiding plates, one disposed on either side of said conveyor in order to retain the letters upon said elongated members. When a conveyor is adapted to propel letters standing on edge, the outer surface of said conveyor then being in a substantially vertical plane, a conveyor bed plate is disposed beneath and extending between said elongated members and said conveyor.

Also in the preferred form of the present invention letters being fed to a conveyor belt have been previously marked with a pattern code indicative of the points along the conveyor at which the letter should leave the conveyor, said letters being scanned by an electronic code reading device, the pulses excited in said code reading device by said pattern code being adapted to electro-mechanical means to cause said letters to drop from said conveyor at the correct point.

In the accompanying drawings which illustrate the preferred embodiments of the present invention.

Figure 1:
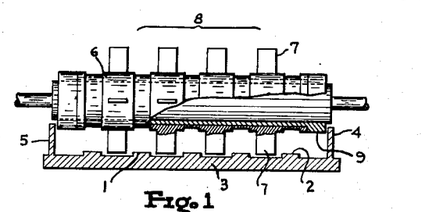
Figure 1 is an end elevation of a conveyor adapted to convey letters lying flat.

A number of flat strips 1, of metal, plastic or other suitable material, having their broad faces 2 in substantially the same plane, are rigidly held by means for crosspieces 3 between two side guiding plates 4 and 5. An endless belt 6 is held directly above the strips 1 so that the tips of the teeth 7 of a comb 8 transversely secured to the outer surface 9 of the belt 6 extend downwardly between the strips 1. Combs similar to that indicated by numeral 8 are secured to the outer surface 9 of the belt 6 at regularly spaced intervals therealong. Thus if a letter, for example, is placed upon the strips 1 between the side guiding plates 4 and 5, it will be pushed along by the teeth 7 of the comb 8 when the belt 6 is driven.

It will be understood that the use of the combs 8 and the teeth 7 thereof in the present specification is merely by way of an example of one type of many types of pusher members which may be employed. In certain applications, for instance, a chain type conveyor having but one pusher member at each point along its length has been found to be quite satisfactory.

Figure 2:
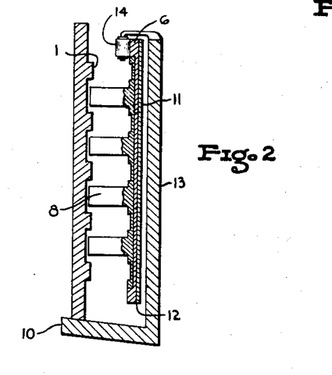
Figure 2 is a cross-section of a conveyor adapted to convey letters on edge.

Figure 2 illustrates a conveyor adapted to propel items such as letters standing on edge. It will be noted that the outer surface 9 of the belt 6 and the plane of broad faces 2 of the strips 1 are substantially vertical and thus form the sides of a deep channel. In order to retain letters and the like between the strips 1 and the belt 6, a conveyor bed plate 10 is rigidly held immediately beneath and extending between the strips 1 and the belt 6. When the belt 6 is, thus, held upright it is necessary to reinforce the flexible material of which the belt is made. This is done with rigid inserts 11 of metal, or other such strong material, which are embedded into the inner surface 12 of the belt 6 immediately behind each of the combs 8.

To give the belt 6 further support, a backing plate 13 is firmly secured parallel and opposed to and extending the length of the inner surface 12 of the belt 6. Spaced along the upper edge of the backing plate 13 are rollers 14 so held that they loosely retain the belt 6 against the backing plate 13. As yet a further belt stabilizing feature, the drive rollers 15 could be spring-loaded to maintain the belt 6 tense. As previously indicated, it may be convenient in certain applications to use a chain type conveyor. When such is used, the backing plate 13 may conveniently become one side of the deep channel, the other side of which being formed by the strips 1. In such a case the chain conveyor might run along the side of the backing plate remote from the strips 1 and individual pusher members could extend across the channel through a slot formed in the backing plate 13.

Figure 3:
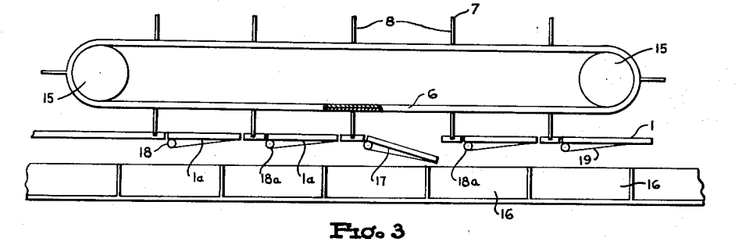
Figure 3 is a longitudinal section of a conveyor adapted to convey letters lying flat.

Referring now to Figure 3, a conveyor of the type illustrated in Figure 1 is shown with a series of boxes 16 situated beneath the strips 1. Doors 17 are let into the surface presented by the broad faces 2 of the strips 1 above each of the boxes 16. Each of the doors 17 consists of strips 1a, which form continuations of the strips 1 when the door is closed. Hinge drums 18 are secured to the underside of the strips 1a at right-angles thereto and at the end thereof nearest the beginning of the conveyor, i.e. the strips 1a extend from the drums 18 in the direction of movement of the belt 6. The hinge drums 18 are pivotable about their longitudinal axes on pivots.

By means which will be discussed later, any given door 17 may be caused to open downwardly simultaneously with the arrival at the door 17 of an article propelled by the conveyor between any given pair of combs 8. It will be noted that in order to present a smooth surface to the passage of the article into a box 16 over an open door 17, the strips 1a are continued around the drum 18. Depending upon the depth to which the teeth 7 of the combs 8 extend downwardly between the strips 1 and 1a, grooves may be formed in the surface of the drum 18 to coincide with the spaces between the strips 1 and 1a.

Figure 4:
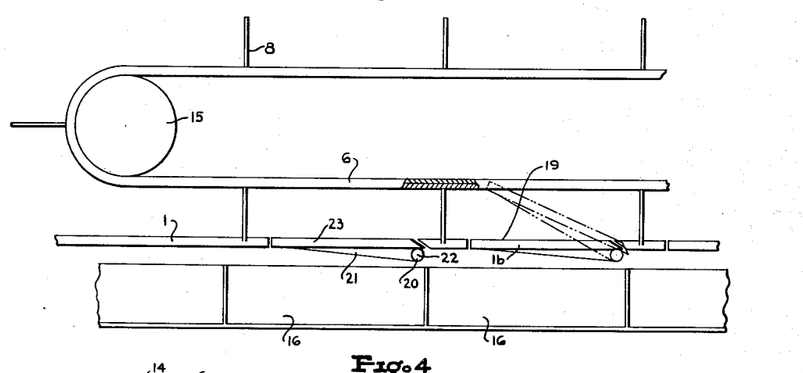
Figure 4 is a partial longitudinal section of Figure 3.

When the belt 6 is driven at relatively high speeds, the force of gravity may not be sufficient to cause the articles propelled by the conveyor to fall into the boxes 16 when they encounter an open door 17. This is especially true of letters which might well jump the gap left by an open door 17. In order to avoid this, doors 19 opening upwards against the direction of movement of the belt 6, may be used as shown in Figure 4. Again, doors 19, as in the case of the doors 17, consist of strips 1b which form a continuation of the strips 1 when the door is closed. In this case, hinge drums 20 are secured to the underside of the strips 1b at right-angles thereto and at the end thereof remote from the beginning of the conveyor. Tapering tongues 21 are provided on the hinge drum 20 extending rearwardly with respect to the direction of movement of the belt 6, one beneath, and secured to each of the strips 1b. The hinge drums 20 are pivotable about their longitudinal axes on pivots 22. It will be seen that an article on the conveyor will be deflected downwardly into a box 16 on meeting an open door 19. The underside of the tapered tongues 21 provides a smooth deflecting surface.

Figure 5:
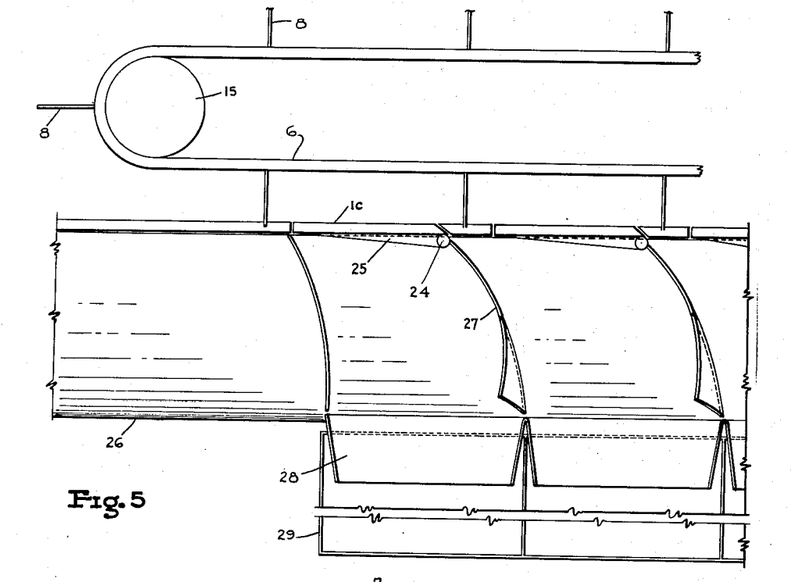
Figure 5 is a partial plan of a conveyor adapted to convey letters on edge.

Referring to Figure 5, when a conveyor is adapted for conveying or propelling letters and the like standing on edge, as shown in Figure 2, inwardly opening doors 23 are provided to divert the letters from the conveyor. The doors 23, similar in structure to those shown by the numeral 19 in Figure 4, are used. The entire conveyor is, in effect, the same as that shown in Figure 4, but standing on edge. The doors 23 consist of strips 1c secured, at the end thereof remote from the beginning of the conveyor, to hinge drums 24 which are provided with tapering tongues 25 and are pivotable about their longitudinal axes. In this embodiment, however, a broad belt-conveyor 26, the width of which is substantially equal to the length of the strips 1, is held adjacent the strips 1, external of the conveyor, at right-angles to the direction of the motion of the belt 6 (which is anti-clockwise in all the figures concerned).

Held slightly above the belt-conveyor 26 and extending from the hinged or pivoted side of the doors 23 are guide plates 27. The upper edge of each of the guide plates 27 is progressively bent inwards with respect to the door 23 from which it extends in order to ensure that letters passing through the doors 23 are caused to fall flat on the belt-conveyor 26.

A further precaution which may be taken to ensure this is that the conveyor bed plate 10 may be slightly transversely inclined upwardly from the belt 6 to the strips 1 as indicated in Figure 2. This would cause the letters, when diverted from the conveyor by the doors 23, to tend to lean away from the guide plates 27 and thus fall flat.

Chutes 28 leading to boxes 29 are situated at the end of the belt-conveyor 26 remote from the strips 1, these being so positioned with respect to the doors 23 and the guide plates 27 that the doors 23 divert letters each into a given box 29.

It will be seen from Figure 5 that, since the belt 6 is endless, an arrangement of strips 1 and doors 23 as that illustrated might be used in conjunction with both sides of the belt 6, the conveyor system being fed from either end.

The feed of a conveyor as shown in Figure 3 or 4 may be of the well known roller type such as is employed in automatic cancelling machines. The timing of such a feed-mechanism may either be controlled directly from the drive rollers 15 or from a sprocket co-operating with a chain (not shown) attached to one edge of the belt 6. The timing tolerance of the feed-mechanism employed may be quite large since the spacing between the combs 8 is somewhat larger than the largest letter and as long as any given letter is fed between the desired two adjacent combs 8, it will be correctly registered against the rearmost of the combs 8 by the pushing action thereof.

Figures 6, 7:
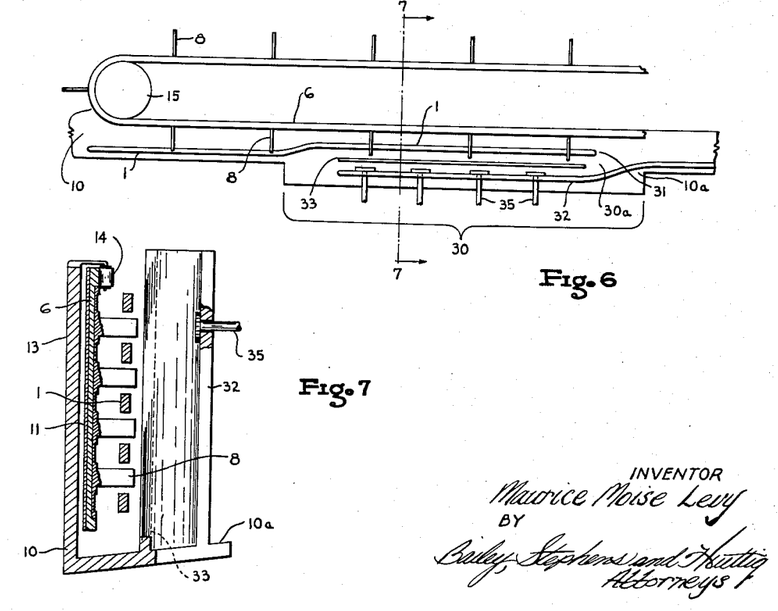
Figure 6 shows a feeding station for a conveyor.
Figure 7 is a cross-section of Figure 6 along the line 7—7.

An alternative method of feeding letters to a conveyor adapted to convey letters standing on edge, is shown in Figures 6 and 7. At a feeding section 30 the strips 1 are gradually curved inwardly from their normal position to a position still parallel to but closer to the belt 6, this to cause the teeth 7 of the combs 8 to protrude therebetween. At the end of the feeding section 30 remote from the beginning of the conveyor the strips 1 are disconnected, to be continued again at the previous, normal distance from the belt 6. Thus an opening 30a into the conveyor is formed. Extending rearwardly the strips 1 which continue beyond the feeding section 30 (the words "rearwardly" and "beyond" being used in relation to the direction of the movement of the belt 6) is a feed guide plate 32 which is supported on a lateral extension 10a of the conveyor bed plate 10. From the point of contact with the strips 1, the feed guide plate 32 is gradually curved away from the strips 1 and then extends parallel to the strips 1 in a direction opposite to the direction of movement of the belt 6. Thus, for the length of the feeidng section 30, the belt 6, the strips 1 and the feed guide plate 32 are parallel one to another. However, while the teeth 7 of the combs 8 protrude through the spaces between the strips 1 along the length of the feed section 30, they do not extend right to the feed guide plate 32.

The lateral extension 10a of the conveyor bed plate 10 is inclined upwardly towards the feed guide plate 32 between it and the strips 1, and a guide rail 33 is secured thereto parallel to the feed guide plate 32. The guide rail 33 is so disposed as to be just beyond the reach of the teeth 7 and it extends along the feeding section 30 to the point at which the feed guide plate 32 commences to curve inwardly to meet the ends 31 of the strips 1.

Letters are now fed, on edge, onto the lateral extension 10a of the conveyor bed plate 10 between the guide rail 33 and the feed guide plate 32. Due to the inclination of the lateral extension 10a, the letters will lean on the feed guide plate 32 with their lower edges abutting against the guide rail 33 (as can be seen from Figure 7). All that is now necessary to introduce the letters onto the conveyor is to push or pivot them about their lower edges until they lean on the external side of the strips 1, rather than on the feed guide plate 32. It will be seen that in this latter position the letters will be caught by the teeth 7 and propelled along thereby onto the conveyor proper. The means employed to pivot the letters about their lower edges may be two or more plungers 35 cam-actuated to move inwardly in synchronization with the occurrence opposite the plungers 35 of a space between two adjacent combs 8 on the belt 6. The plungers 35 may be driven and synchronized with the belt 6 in a manner similar to that mentioned in connection with the well known roller-type feed-mechanism.

The opening of the doors of the embodiments shown in Figures 3, 4 and 5 requires a form of delayed control which will be discussed later in this specification. The embodiments shown in Figure 8, however, permit direct control of the point of departure of a letter or the like from a conveyor.

Figure 8:
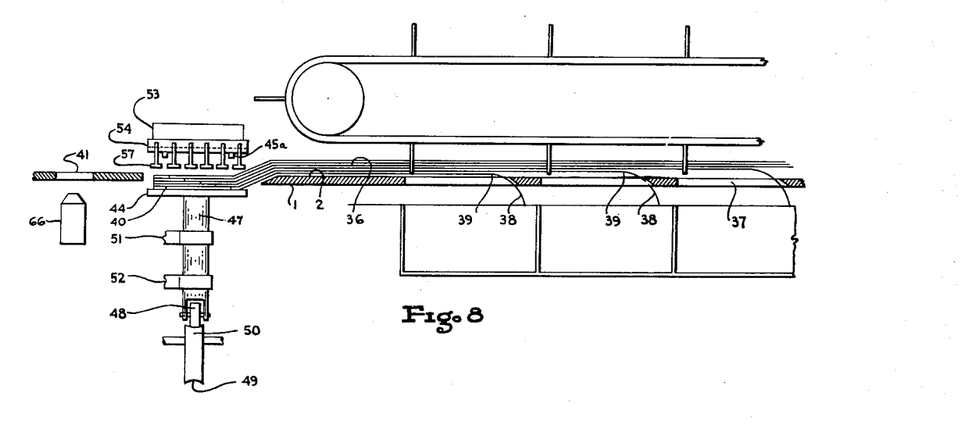
Figure 8 shows an arrangement for controlled diversion of letters from a conveyor adapted to convey letters lying horizontal.

A series of channels are formed between selection bands 36 of flexible material extending one above the other parallel to the strips 1 between the latter and the belt 6. There may be one or more sets of the bands 36, as desired. However, they must be sufficiently narrow to pass between the teeth 7 of the combs 8 and, therefore, oriented one set directly above a strip 1. Commencing with the lowest, the band 36 terminate at successive openings 37 in the surface presented by the broad faces of the strips 1. The band 36 terminating at each opening 37 is attached to an outlet guide plate 38 which curves downwardly through the opening 37. The leading or upper edge 39 of the outlet guide plates 38 is slotted to allow free passage of the teeth 7 of the combs 8.

At the beginning of the conveyor, slightly in advance of the belt 6 in order to clear the combs 8, the bands 36 are attached each to a separate channel-selection plate 40. The channel-selection plates 40 are supported between the strips 1 and the letter-supporting surface 41 of the feed-mechanism. In order to direct a given letter to a given opening 37, the letter has to be fed onto the conveyor immediately beneath the band 36 which terminates at the opening 37 to which the letter is directed.

Figure 9:
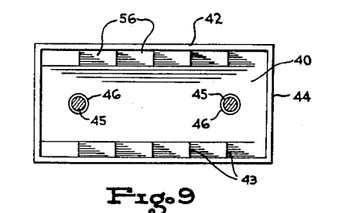
Figure 9 is a plan view of channel selection plates.
Figure 10:
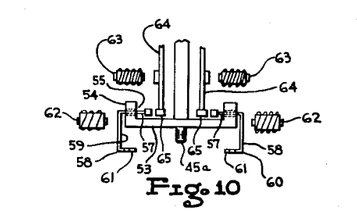
Figure 10 is a cross-sectional view of the channel selection plate holding mechanism.

The mechanism for effecting this will be seen by reference to Figures 8, 9 and 10, the latter two figures showing detail.

The sides 42 of the channel-selection plates 40 are stepped, the cutaway portion 43 of each successive channel-selection plate 40 being shorter from the lowest channel-selection plate 40 up.

The channel-selection plates 40 are supported on a platform 44 having studs 45 thereon co-operating with holes 46 in the channel-selection plates 40 to prevent lateral movement thereof. The studs 45 are of a length substantially equal to the combined thickness of all the channel-selection plates 40. The platform 44 is rigidly attached to a rod 47 to the lower end of which is attached a wheel or roller 48. The wheel or roller 48 in turn rests upon the edge 49 of a cam 50. Supports 51 and 52 slidably support the rod 47 permitting vertical movement thereof but no lateral movement. The cam 50 is of such dimension that when the rod 47 is in its lowest position, the channel-selection plates 40 on the platform 44 are all below the level of the broad faces 2 of the strips 1.

Held immediately above the channel-selection plates 40 is a pin-retaining plate 53 of substantially shallow U-shaped cross-section and no greater in overall width than the channel-selection plates 40. The pin-retaining plate 53 is disposed with the sides 54 thereof parallel to the longitudinal axes of the strips 1 and at a height above the level of the broad faces 2 of the strips 1 such that a very thick letter could pass beneath it at the level of the broad faces 2 of the strips 1 with a clearance at least equal to the combined thickness of all the channel-selection plates 40.

A series of holes 55 are formed in the sides 54 of the pin-retaining plate 53 oriented in opposing pairs, one pair above each successive exposed portion 56 of the channel-selection plates 40. Retaining pins 57 are provided one in each of the holes 55 and each has depended from the outer extremity thereof a substantially L-shaped hook 58. The shanks 59 of the hooks 58 are substantially normal to the plane of the channel-selection plates 40 and are of a length slightly greater than the combined thickness of the channel-selection plates 40. The arms 60 thereof project inwardly at right-angles to the longitudinal axes of the channel-selection plates 40. The innermost ends of the arms 60 are broadened into flukes 61 which are somewhat narrower than the length of the exposed portions 56 of the channel-selection plates 40.

Opposite the outer extremity of each of the pins 57 is rigidly held a magnetic hammer 62. Situated above the pin-retaining plate 53 and one to either side thereof are two electrically operated relays 63, the arms 64 of which are substantially T-shaped. The arms 64 of the relays 63 are so disposed that the cross-pieces 65 of the arms 64 are parallel to the sides 54 of the pin-retaining plate 53 and opposed to the inner extremities of the pins 57.

By means of the magnetic hammers 62 and the relays 63 the pins 57 may be moved to one of two positions. When the relays 63 are actuated the pins 57 are pushed by the cross-pieces 65 into their outermost position, the distance between the flukes 61 of an opposing pair of pins 57 then being greater than the width of the channel-selection plates 40. When the magnetic hammers 62 are actuated the pins 57 are pushed by them into their innermost position, in which position the flukes 61 thereof are spaced apart at a distance less than the width of the channel-selection plates 40.

Thus it will be seen that if the cam 50 is revolved so that the channel-selection plates 40 are raised upon the rod 47 to their uppermost position, and if an opposing pair of magnetic hammers 62 is actuated, an opposing pair of pins 57 will be moved to their innermost positions and the flukes 61 thereof will pass beneath the sides 42 of the channel-selection plates 40. As the holes 55, and therefore the pins 57, are oriented one opposing pair above each successive exposed portion 56 of the channel-selection plates 40, when the cam 50 revolves and lowers the rods 47 the flukes 61 of the inwardly-pushed pins 57 will engage the exposed portions 56 (Fig. 9) immediately above them and retain against the pin-retaining plate 53 all those channel-selection plates 40 above the one the exposed portions 56 of which are resting on the flukes 61. The remaining channel-selection plates 40, i.e., those beneath the one resting immediately upon the flukes 61 will, of course, descend with the rod 47.

Hollow studs 45a, co-operating with the holes 46 in the channel-selection plates 40 and with studs 45 on platform 44, are provided on the underside of the pin-retaining plate 53.

A letter may thus be caused to pass between any given pair of channel-selection plates 40 by the synchronized action of the cam 50 and the magnetic hammers 62. A pattern code will be imposed upon a letter indicative of the opening 37 through which the letter is to be deposited from the conveyor. Such pattern code will be imposed in the manner described in my prior United States patent application Serial No. 360,540, filed June 9, 1953. The electronic scanning device 66 scans the pattern code and determines therefrom the channel into which the letter is to be directed. For each channel to be open to the letter a unique number of plates 40 requires to be held up by the unit shown in Figure 10. Normally all the retaining pins 57 are spread open to allow all the plates 40 to pass upwardly between them, until this movement is arrested by the top plate 40 striking against the underside of the plate 53. Registration is obtained by the hollow studs 45a which enter the holes 46 in the plates 40 and pass over the studs 45, passing between such studs and the edges of the holes 46 in the plates.

A signal from the scanning device 66 now actuates a predetermined number of pairs of hammers 62 to move inwardly those retaining pins 57 associated with the actuated hammers. This causes retention against the plate 53 of the requisite number of channel plates 40. The unretained plates 40 then descend with platform 44, leaving a gap between the retained and unretained plates, such gap defining a channel to receive the letter, which now passes from the scanning device 66 to the sorting portion of the apparatus. The letter is then conveyed along the conveyor by means of the combs 8 until it reaches the opening 37 to which it is destined and through which it is deflected by an outlet guide plate 38.

Figure 11:
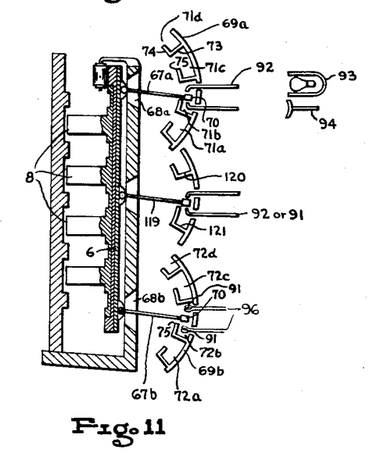
Figure 11 is a cross-section of a conveyor adapted to convey letters on edge showing gate control means.
Figure 12:
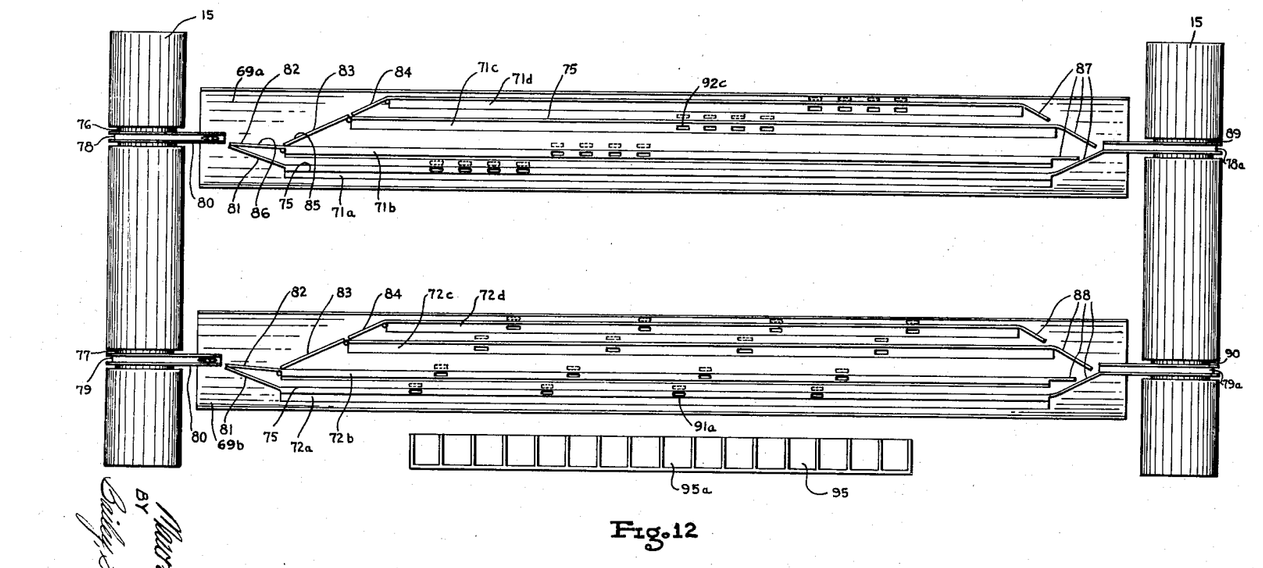
Figure 12 is a slide elevation of gate control means as shown in Figure 11.

Figures 11 and 12 show a method of controlling the actuation of gates such as are indicated by numeral 23 in Figure 5, for example. Two pins 67a and 67b are pivotally attached one to each side of the back of the belt 6 behind each comb 8 thereon. The pins 67a and 67b extend through longitudinal slots 68a and 68b formed in the backing plate 13. Rigidly held in opposition each to one of the parallel rows of pins 67a and 67b so formed along the back of the belt 6 are transversely-arcuate, pin-guide supporting plates 69a and 69b. The plates 69a and 69b extend substantially along the length of the backing plate 13 and are held close to the free ends 70 of the pins 67a and 67b. The arcuate shape of the plates 69a and 69b is such that in cross-section the respective plates 69a and 69b form part of a circle each about the point lying in the plane in which the pins 67a and 67b respectively are attached to the belt 6. Thus if the pins 67a were pivoted in a transverse plane normal to the plane of the belt 6 the free ends 70 thereof would describe circles concentric with and of slightly smaller radius than the circle an arc of which is formed by the cross-sectional configuration of the plate 69a opposing the aforesaid pins 67a.

Extending along and rigidly attached to the concave surface of the plates 69a and 69b are pin-guides 71a to 71d and 72a to 72d. The pin-guides 71a to 71d are L-shaped in cross-section and are spaced about the concave surface of the plate 69a so that the foot 73 of the L extends radially from the plate 69a, the upright arm 74 of the L being remote from the plate 69a. The pin-guides 72a to 72d are similarly mounted on the concave surface of the plate 69b.

The free ends 70 of the pins 67a and 67b are spatulate and the broad faces thereof lie in the plane in which lie all the pins 67a and 67b in one row. The dimensions of the pin-guides 71a to 71d and 72a to 72d are such that a pin 67a and 67b passing between any two adjacent guides would rest on the upper edge 75 of the upright arm 74 of the guide immediately beneath the pin 67a and 67b. The spatulate end 70 thereof extending beyond the edge 75 and passing above the foot 73 of the guide 71a to 71d and 72a to 72d.

Considering now Figure 12 in particular and assuming the direction of motion of the belt 6 to be from left to right of the drawing, the two lower pin-guides 71a and 71b and 72a and 72b extend along the plates 69a and 69b from substantially the same vertical line normal to the longitudinal axes of the aforesaid plates whereas the pin-guides 71c and d and 72c and d extend along the plates 69a and 69b from points spaced at relatively short intervals along the length of the plates.

Two grooves 76 and 77 are formed in the leading drive roller 15 at the beginning of the conveyor one aligned with the space between the pin-guides 71b and 71c on plate 69a, and one aligned with the space between pin-guides 72b and 72c on plate 69b. Passing about the leading roller 15 one in each of the grooves 76 and 77 are two substantially U-shaped pin-aligning channels 78 and 79. The channels 78 and 79 are so held that the mount of the U faces outwards with respect to the circumference of the roller 15 and also so that the inner surface of the lower side 80 of the channels 78 and 79 are aligned respectively with the edges 75 of the pin-guides 71b and 72b.

Extending from the terminal point of the lower side 80 of each of the channels 78 and 79 to the edges 75 of pin-guides 71a and 72a are guide-members 81. A gate 82 is hinged at the point of commencement of the edges 75 of each of the pin-guides 71b and 72b which gate extends to the terminal point of the lower side 80 of each of the channels 78 and 79. In a similar manner a gate 83 extends between the point of commencement of the edges 75 of each of the pin-guides 71c and 72c, at which point it is hinged, to the point of commencement of the edges 75 of each of the pin-guides 71b and 72b. Yet again a gate 84 extends in similar manner between the pin-guides 71d and 71c and 72d and 72c.

The gates 82, 83 and 84 are all so positioned as to give the minimum resistance when closed to the pins 67a and 67b passing thereover. This may be seen by reference to Figure 12 wherein the free end of each gate 82, 83 and 84 when closed lies slightly below the level of the preceding pin-supporting surface, i.e., the pin-supporting surface 85 of gate 83, when closed, lies at its lowest point, slightly below the level of the pin-supporting surface 86 of the gate 82.

At the end of the conveyor, guide-members 87 and 88 extend from the edges 75 of the pin-guides 71a to 71d and 72a to 72d respectively. The arrangement of the guide-members 87 and 88 is such that the pins 67a and 67b passing along the edges 75 of the pin-guides 71a to 71d and 72a to 72d are directed into U-shaped channels 78a and 79a respectively as is clearly shown in Figure 12. The channels 78a and 79a encircle the drive roller 15 at the end of the conveyor in grooves 89 and 90, which are co-planar with the grooves 76 and 77, and may be continuations of the channels 78 and 79 so that the pins 67a and 67b are supported throughout one complete circuit about the drive rollers 15. If desired, of course, the arrangement as described above in connection with Figures 11 and 12 may be duplicated at the back of the conveyor in the event that one belt 6 is adapted to operate two conveyors.

Referring once again to Figure 11, it will be seen that pairs of coils 91 may be located at intervals along the length of the plates 69a and 69b so disposed that they are held substantially between the various pin-guides 71a to 71d and 72a to 72d and the corresponding plates 69a and 69b. The pairs of coils 91 are so spaced apart that the spatulate ends 70 of the pins 67a and 67b may pass therebetween.

Alternatively, light-transmitting tubes 92 may be used in place of the coils 91. The tubes 92 extend through the plates 69a and 69b and curve inwardly upon one another substantially in the space partially enclosed by the pin-guides 71a to 71d and 72a to 72d so that the ends of the tubes 92 in the aforesaid space are directed towards one another. Light is introduced into one of the tubes 92 by means of a lamp 93, see Figure 11. This light is transmitted along the one tube 92, passes into the other tube 92 at the outer end of which is located a photocell 94.

Assuming that the conveyor has sixteen gates therein the pairs of coils 91 or tubes 92 are located along the length of the plates 69a and 69b as is illustrated in Figure 12. The 16 boxes 95 are divided into groups of four and the pin-guides 71a to 71d mounted on plate 69a represent each one group of four boxes 95. Thus four pairs of coils 91 or tubes 92 are spaced along the plates 69 in between it and the pin-guide 71a each successive pair being aligned with the side of each successive box 95, in the first group of four thereof, nearest the beginning of the conveyor. Four pairs of coils 91 or tubes 92 are spaced along the plate 69a between it and the pin-guide 71b each aligned with the edge of the boxes 95 in the second group of four thereof nearest the beginning of the conveyor. Similarly four pairs of coils 91 or tubes 92 are spaced along the plate 69a between it and each of the pin-guides 71c and 71d.

Pairs of coils 91 or tubes 92 are also spaced along the plate 69b aligned with the edges of the boxes 95 nearest the beginning of the conveyor, only in this instance the pair of coils 91 or tubes 92 aligned with the first of the boxes 95 is disposed between the plate 69b and the pin-guide 72a, the pair of coils 91 or tubes 92 aligned with the second box 95 is disposed between the plate 69b and the pin-guide 72b. The pairs of coils 91 or tubes 92 which are aligned with the third and fourth boxes of boxes 95 are disposed between the plate 69b and the pin-guides 72c and 72d. Similarly the pairs of coils 91 or tubes 92 aligned with the boxes 95 in the second, third and fourth groups of four thereof are successively disposed on a level with the pin-guides 72a to 72d.

Letters, as they are fed onto the conveyor, are scanned by an electronic scanning device similar to that shown in Figure 8 which, with the aid of a magnetic drum type memory, actuates the gates 82, 83 and 84 mounted on the plates 69a and 69b respectively so that the pins 67a and 67b attached to the belt 6 behind the comb 8 (Figure 11) immediately preceding the letter scanned will be directed to ride along the edge 75 of a specific pin-guide 71a to 71d and a specific pin-guide 72a to 72d (Figure 12). Let us assume that all letters to Montreal must be deposited in the ninth one of the boxes 95, such ninth box being indicated in Figure 12 by the numeral 95a. The electronic scanning device will receive impulses upon scanning a Montreal letter corresponding to the name "Montreal." These signals are then applied to a magnetic drum which, in response thereto, supplies the correct signals required to open gate 84 on plate 69a (Figure 11) and to open the gate 82 on the plate 69b. Thus the two pins 67a and 67b mounted behind the comb 8 pushing the Montreal letter are directed one onto the edge 75 of the pin-guide 71c and one onto the edge 75 of the pin-guide 72a. By studying Figure 12 it will be noted that the two pins 67a and 67b will only pass between a pair of coils 91 and tubes 92 simultaneously when in line with the edge of the ninth box 95a nearest the beginning of the conveyor, that is when the pin 67a is in register with tubes 92c and the pin 67b is in register with coils 91a shown in Figure 12.

When pairs of coils 91 are used one coil is activated whereupon a current is induced in the other coil of the pair, thus a steady, induced voltage appears across the terminals 96 of the non-activated coil. Similarly the light from the lamp 93 passing through the tubes 92 excites a steady voltage in the photocell 94. In either case when the spatulate end 70 of the pins 67a and 67b pass between any two coils 91 or tubes 92 the voltage in the non-activated coil 91 or the voltage excited in the photocell 94 disappears. This, however, only occurs during the period in which the spatulate ends 70 of the pins 67a and 67b pass therebetween so producing a negative-going pulse.

Figures 13, 14:
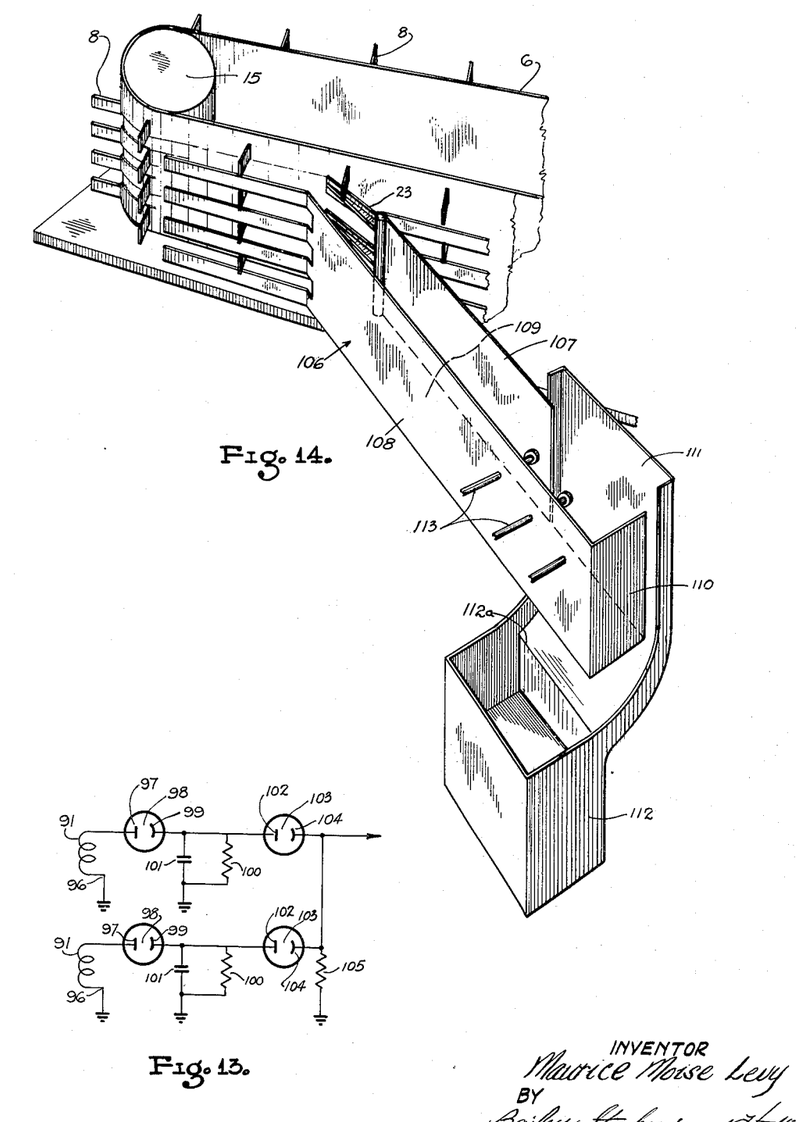
Figure 13 shows a control circuit for use in connection with gate control means.
Figure 14 is a perspective view of a branch guide outlet.

Figure 13 illustrates a circuit which will only supply a pulse when two other pulses are applied thereto simultaneously. One side of the coil 91 in which a voltage is induced or the photocell is connected to the anode 97 of a diode 98. The cathode 99 of the diode 98 is connected to ground through a resistance 100 and a by-pass condenser 101 together with the other terminal of the coil 91 or the photocell 94. The cathode 99 of the diode 98 is also connected to the anode 102 of a second diode 103. If the pairs of coils 91 or tubes 92 mounted on the plates 69a and 69b respectively and both in alignment with the same box 95 are connected to such circuits as above described, and if the caathodes 104 of the diodes 103 are connected to a common cathode resistance 105, a pulse may be taken off the side of the common cathode resistance 105 above ground only when a pulse is applied to each of the anodes 97 simultaneously.

Thus it will be seen that only when two pins 67a and 67b secured to the belt 6 behind any one comb 8 pass between a pair of coils 91 or tubes 92 simultaneously will a pulse appear at the common junction of the cathodes 104 and the resistance 105. This pulse may then be used to open the appropriate gate (i.e. 23 of Figure 5) in order to divert the letter immediately following the comb 8, behind which the particular pins 67a and 67b are attached, into the box with which the particular pairs of coils 91 or tubes 92 are aligned.

While a very specific method of controlling the operation of gates (such as those indicated by numeral 23 in Figure 5) has been described, it will be understood that many different types of electro-mechanical means may be employed to operate the appropriate gates at the correct time. The particular embodiment described is not to be considered as limiting the invention to that particular embodiment.

As an additional refinement to a conveyor of the type disclosed in Figure 5 when the gates 23 thereof are controlled in the manner described above, branch guides such as are shown in Figure 14 may be used. In the sorting of mail it is always advantageous to arrange for the sorted letters to be stored in stacks and all facing in the same direction. When the direction of a letter is changed while the letter is travelling at a relatively high speed it is difficult to ensure that the letters will all fall into the storage space provided in the desired manner. The object, therefore, of the embodiment shown in Figure 14 is to halt the motion of the letters substantially in the direction of the conveyor prior to or simultaneously with the actuation of means to change the direction of motion of the letter.

The operation of the branch guides shown in Figure 14 is as follows. When the gate 23 opens the letter is deflected into a branch guide 106 which has side walls 107 and 108 and a base plate 109. The branch guide 106 should preferably extend away from the conveyor at an angle substantially similar to that at which the letter is automatically deflected by the gate 23, i.e. once the letter is deflected by the gate it is then permitted to proceed in a straight line.

At the outer end of the branch guide 106 is a stopping plate 110 against which the letter will be brought to rest. The length of the branch guide 106 is, accordingly, no greater than the distance over which a letter will be carried by the momentum imparted to it by the conveyor itself. The side wall 107 of the branch guide 106 adjacent the conveyor does not extend the full length of the branch guide itself but is terminated at a distance from the stopping plate 110 at least as long as the longest letter which will be passed through the conveyor.

Opposing the space left between the outer end of the side wall 107 and the stopping plate 110 is a chute 111 which, at the portion thereof level with the branch guide 106, is substantially vertical but which, at the portion thereof below the level of the branch guide 106, curves under the branch guide 106. The chute 111 terminates at the rim of a storage box 112, the curve of the chute being such that at the point of contact with the rim 112a of the box 112 the plane of the chute surface is almost horizontal. Known means may be employed to mount in the storage box 112 a vertically adjustable bottom plate (not shown) which can be systematically lowered as letters fall thereinto. This avoids the possibility of a letter turning over in the course of a relatively long drop from the rim 112a of the storage box 112 to the bottom plate thereof.

Extending through the side wall 108 opposite the space between the end of the side wall 107 and the stopping plate 110 are a series of pushers 113. The pushers 113 may be actuated by cam means (not shown) synchronously geared to the drive rollers 15 of the belt 6. Assuming that a series of, for example, 16 branch guides 106 are spaced along the length of a conveyor at intervals corresponding to the space between the combs 8 on the belt 6 the actuation of the pushers 113 may be timed to correspond with the arrival at the stopping plate 110 of a letter directed through the corresponding gate 23.

Thus as a letter is deflected through a gate 23 into a branch guide 106 it is carried by its own momentum to the stopping plate 110 whereupon the pushers 113 are actuated and the letter is pushed off the base plate 109 in the direction of the chute 111. The letter then slides down the chute 111 and is deposited in the storage box 112 address up or otherwise according to the way in which it was fed into the conveyor.

It may here be mentioned that various means may be employed to direct the letter from the base plate 109 to the chute 111, i.e., an air-blast, or, if operation is relatively slow, merely the inclination of that portion of the base plate 109 opposite the chute 111 downwardly towards the chute 111.

Figures 16, 17, 18, 20:
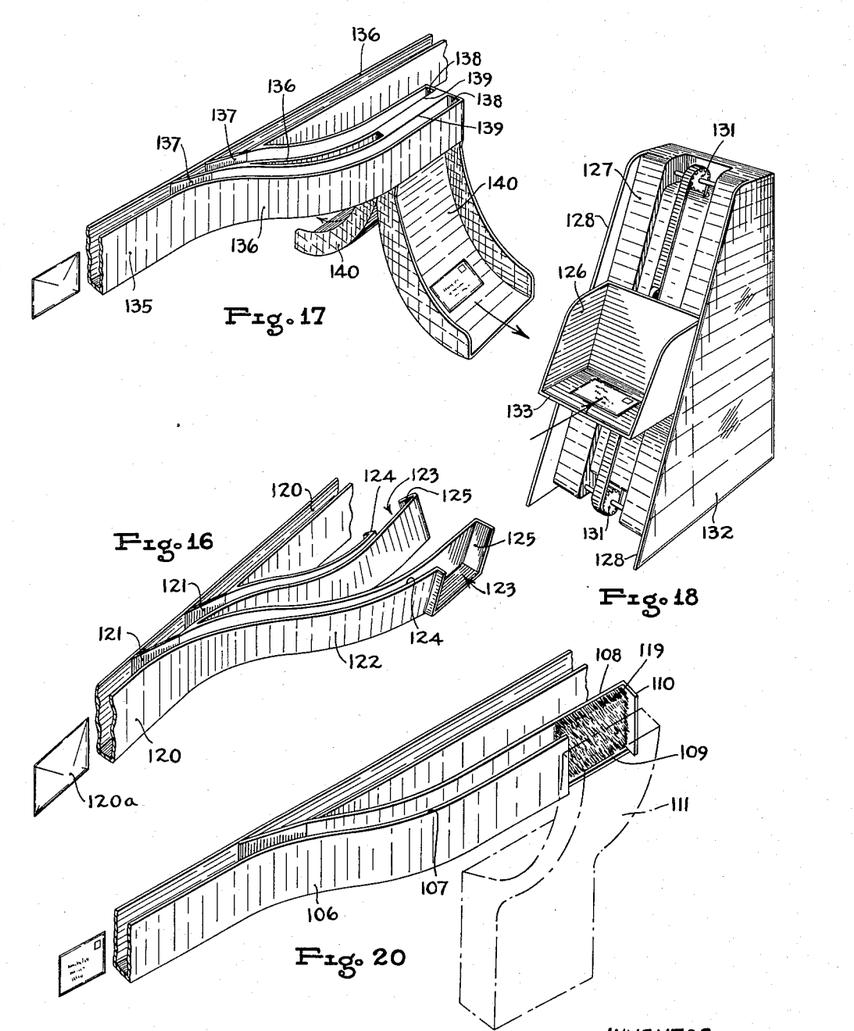
Figure 16 is a perspective view of a third type of branch guide outlet.
Figure 17 is a perspective view of a fourth type of branch guide outlet.
Figure 18 is a perspective view of an independent stacker suitable for use with branch guide outlets of the type shown in Figures 16 and 17 and Figure 19 is a perspective view of a fixed multi-box type stacker suitable for use with branch guide outlets of the type shown in Figures 16 and 17.
Fig. 20 is perspective view of a fifth type of branch guide outlet.

Another and particularly simple method of stopping the movement of a letter along a branch guide 106 and then directing the letter from the branch guide 106 into the chute 111 is to employ a strip of fur 119 attached to the inner surface of the side wall 108 opposite the chute 111 (see Figure 20). The pile of the fur should lie in a direction generally towards the stopping plate 110. In this arrangement a letter travelling along the branch guide 106 encounters the fur 119', forces the individual hairs of the fur to lie flat, the letter eventually coming to rest against the stopping plate 110. The action of the fur 119' at this point is to retard the movement of the letter before it actually strikes the stopping plate 110 and to reduce the rebound of the letter from the stopping plate. Once the letter has been stopped, the hairs of the fur 119', having been flattened by the letter, will tend to resume their normal outstanding position. The force thus exerted against the letter in a direction away from the side wall 108 will be sufficient to push the letter through the space between the outer end of the side wall 107 and the stopping plate 110, onto the chute 111. This action is enhanced if the base plate 109 is slightly sloped at this point towards the chute 111.

As has been indicated by the preceding paragraphs the specific form of the apparatus employed to transfer the letter from the branch guide 106 to the chute 111 is not important. The important point is that the movement of the letter in the initial direction upon ejection from the conveyor be halted and that movement then be imparted to the letter in another direction such that stacking of the letter in a predetermined position is possible.

If the operation of a conveyor is relatively slow advantage can be taken of the embodiment described in Figure 14 to double the number of outlets of a conveyor. This will be seen by reference to Figure 15. A center wall 114 is centrally located in the branch guide 106 dividing it into two compartments 106a and 106b. At the end of the center wall 114 nearest the conveyor a gate 115 is located so that by actuation thereof a letter diverted by the gate 23 concerned may be directed into either of the compartments 106a and 106b. The side walls 107 and 108 in this embodiment both extend to the stopping plate 110. However, the base plate 109 is discontinued at a point spaced from the stopping plate 110 a distance at least equal to the longest letter to be conveyed by the conveyor. Located beneath the compartments 106a and 106b and occupying the space left between the termination of the base plate 109 and the stopping plate 110 are two gates 116a and 116b hinged beneath the side walls 107 and 108 and opening downwards when actuated.

Figure 15:
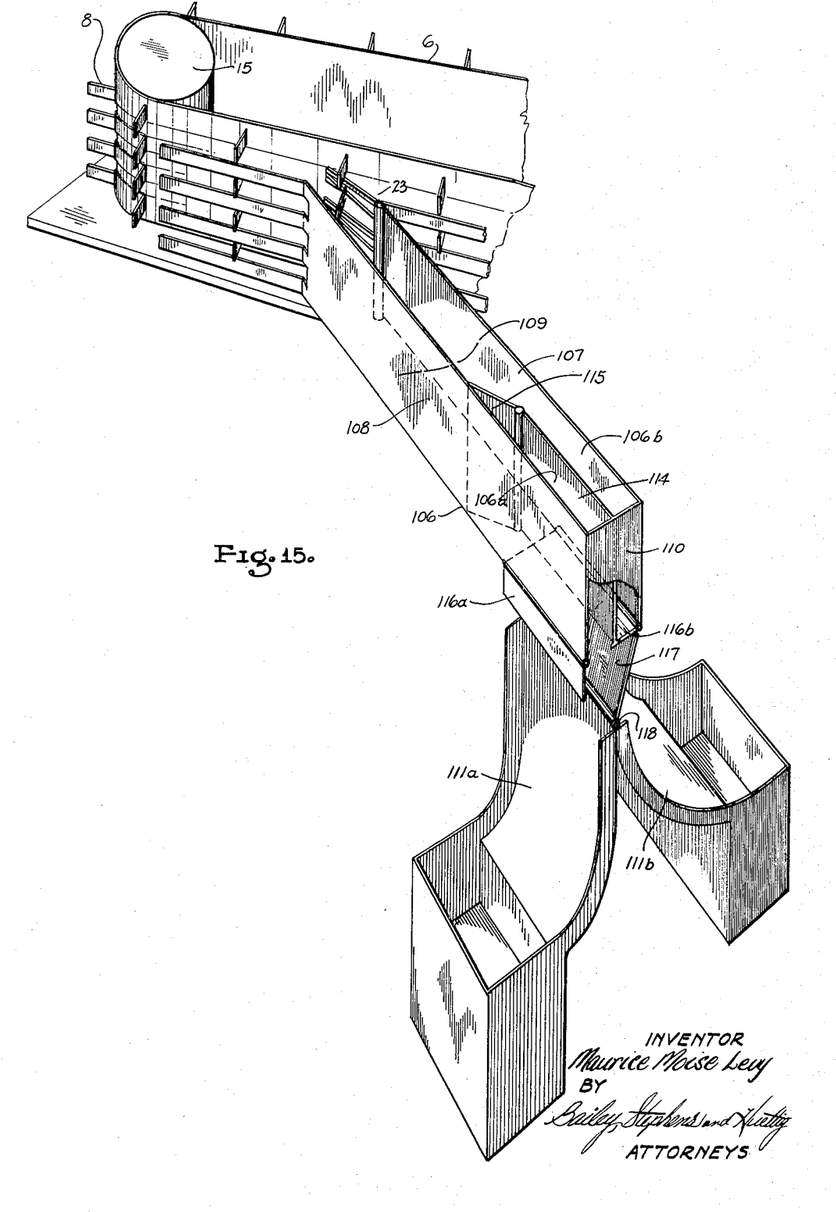
Figure 15 is a perspective view of a second type of branch guide outlet.

The gates 115 and 116a and 116b are all cam-actuated and are geared to the drive rollers 15. The timing of these gates is such that the gate 115 will open the compartments 106a and 106b alternatively with the occurrence of a comb 8 opposite the appropriate gate 23 and that the gates 116a and 116b will be opened alternatively also in time with the occurrence of the comb 8 at a gate 23. The order in which the gates 116a and 116b open in relation to the movement of the gate 115, however, is that the gate 116a or 116b beneath the compartment 106a or 106b which has been closed off by the gate 115 is the one which opens. Thus if two letters immediately following one another, being conveyed by adjacent combs 8, are directed into the same branch guide 106, the first letter may be directed into the compartment 106a, the gate 116a beneath which is being closed. As soon as this letter is in the compartment 106a and the comb pushing that letter arrives at the gate 23 concerned, the gate 115 is actuated closing off the compartment 106a and opening the compartment 106b. When this occurs the gate 116a automatically opens and the gate 116b which had previously been opened now closes so that the second letter is supported in compartment 106b thereby. This alternate opening and closing of the gates 116a and 116b with the movement of the gate 115 continues automatically irrespective of whether any letters are directed into branch guides 106 by the appropriate gates 23.

Directly beneath the gates 116a and 116b and aligned with the center wall 114 is situated a gate 117. The gate 117 is hinged along its lower edge to the point of convergence 118 of two chutes 111a and 111b disposed back to back, both curving downwardly and outwardly from the point of convergence 118. The gate 117 moves through an arc subtending the angle substantially between the lower edges of the side walls 107 and 108 and the point of convergence 118 of the chutes 111a and 111b. Thus when either of gates 116a or 116b is opened the letter which is permitted to drop may be deflected down either of the chutes 111a or 111b according to the position of the gate 117.

A control of the gate 117 may be effected in a manner similar to that described above in connection with Figures 11 and 12. A third pin 119 may be attached to the belt 6 behind each of the combs 8 disposed substantially halfway between the pins 67a and 67b, see Figure 11. These pins may be guided about drive rollers 15, see Figure 12, by means of pin-aligning channels similar to those indicated by numerals 78 and 79 of Figure 12. Two pin-guides 120 and 121 are held opposing the inner surface of the belt 6 intermediate the pin-aligning channels, and a gate is disposed at the end thereof closest the beginning of the conveyor in order to divert the intermediately-located pins 119 into either one of the pin-guides 120 and 121. Along one of the additional pin-guides 120 and 121 are disposed a series of pairs of coils or tubes, such as those indicated by numerals 91 and 92 of Figure 11, one aligned with each outlet gate along the length of the conveyor.

As each letter is scanned prior to entering the conveyor the pin-guides 67a and 67b behind the comb 8 immediately preceding the letter scanned are directed into the pin-guides 71a to 71d and 72a to 72d according to the impulses derived from the scanning of the letter, as previously described. At the same time the pin 119 attached to the back of the comb 8 immediately following the letter scanned is directed into one of the pin-guides 120 and 121. This may be accomplished by well-known electronic delay means which delays actuation of the gate at the entrance of the pin-guides 120 and 121 by a time interval equivalent to the distance between two adjacent combs 8.

Referring now to Figure 15 in conjunction, the gates 117 are biased to one side of the arc through which they rotate. Thus if a letter is destined to the storage box 112 at the lower end of the chute 111a or 111b onto which the letter will be deflected by the gate 117 when in its quiescent position, no additional impulse, other than that derived from the pins 67a and 67b and actuating the gate 23, will be required. If, on the other hand, a letter is to be directed into the storage box 112 beneath the chute 111a or 111b closed off by the gate 117 when in its quiescent position, an impulse will be required to change the position of the gate 117. Let us assume that two letters immediately following one another on the conveyor are to be directed one onto the chute 111a beneath a certain branch guide 106 and one onto the chute 111b beneath the same branch guide 106. If the gate 117 is so biased, when quiescent, as to deflect letters onto the chute 111a, the pin 119 attached to the rear of the comb 8 immediately following, i.e. pushing, the first of the two letters will be diverted into the pin-guide 120, for example, along which no coils 91 or tubes 92 are located. Thus no pulses will be derived from this pin 119, and the letter will automatically be dropped onto chute 111a. Since the second letter, however, is to be directed onto the chute 111b, the pin 119 attached to the back of the comb 8 immediately following and pushing the second letter will be diverted into pin-guide 121 which has along its length pairs of coils 91 or tubes 92 aligned with each of the gates 23. Thus when the seconl letter is about to be dropped from whichever of the comparatments 106a or 106b into which it has been directed by the gates 115, an impulse will be generated by the passage of the pin 119 between the coils 91 or tubes 92 aligned with the outlet concerned. This impulse may then be used to actuate the gate 117 so diverting the second letter onto the chute 111b.

It will be remembered that a letter is being dropped from one of the compartments 106a and 106b of a branch guide 106 while the letter following immediately, if any, is being directed into the other of the compartments 106a and 106b. It is accordingly essential that the impulses derived from the pins 119 be delayed by a time interval equal to the distance between two adjacent combs 8, hence the necessity of employing the pin 119 attached to the rear of the comb 8 immediately following the letter concerned rather than that attached behind the comb 8 immediately preceding the letter concerned as in the case of the pins 67a and 67b.

In order to reduce the overall length of a sorting conveyor, it may be advantageous to use conveyors having branch guides arranged in pairs, such as those indicated by numerals 122 and 136 in Figures 16 and 17. The gates 121 and 137 respectively are arranged, in this embodiment, in pairs, along the length of the conveyors 120 and 135 respectively. Considering the branch guides 122 of Figure 16 in detail, each of a pair of gates 121 leads into a branch guide 122. The branch guides 122 lead from each such pair of gates 121.

Each gate 121 feeds into a branch guide 122. The branch guides 122, leading from each pair of gates 121, extend in side-by-side relation one to each other, sidewardly and downwardly in respect of the conveyor 120. As they extend from the conveyor 120, each pair of branch guides 122 gradually lean away from one another, and towards the ends thereof, openings 123, at least equal in length to the longest standard-size envelope, are provided in the walls 124, the walls 124 being the wall of each guide remote from its companion branch guide. Each branch guide 122 is terminated by an end wall 125.

Thus when a letter is fed into a branch guide 122 it travels the length thereof, is halted by the end wall 125, and then falls outwardly through the opening 123 due to the inclination of the branch guide 122 to the vertical and the effect of gravity on the letter. It will be noted that two letters one directed into each of a pair of branch guides 122 will fall therefrom below and substantially one to either side of the conveyor 120.

As a letter falls from an opening 123 in a branch guide 122 it moves about its lower edge into a substantially horizontal position. This permits the use of a stacker such as shown in Figure 18. A three-sided tray 126 is held against an inclined surface 127 between guide flanges 128 by means of a hook 129 which engages a drive-chain 130. The drive-chain is an endless chain held about sprocket wheel 131 and driven by a motor (not shown) held within the frame 132 of the stacker.

When sorting commences the tray 126, the open side of which faces away from the inclined surface 127, is so positioned that the bottom 133 thereof is just below the bottom of and opposing the opening 123 in a branch guide 122 (see Figure 8). A photo-cell (not shown) is located just beneath the opening 123 in each branch guide 122. Thus, as more and more letters fall into the tray 126, light is gradually obscured from this cell. When this occurs the signal so produced in the cell starts the motor driving the chain 130 and causes the tray 126 to be lowered. Once the letters in the tray 126 are lowered sufficiently to allow light to reach the cell again, the motor stops. In this manner the distance each letter has to fall remains relatively constant since the tray 126 is continually lowered as it fills with letters. This type of stacker also ensures that all letters remain facing the same way as in the conveyor 120 which facilitates their feeding into another sorter for further sortation, if required.

The branch guides 136, shown in Figure 17, are also admirably suited for use with a stacker such as shown in Figure 18. Here the branch guides 136 extend from a pair of gates 137 in side-by-side relationship and curve so as to extend after leaving the conveyor 135 substantially parallel thereto.

The branch guides 136 are terminated by end walls 138 and extending for a distance at least the length of the longest standard-size envelope back from the end walls 138, an opening (not visible) is provided in the bottom of each branch guide 136. Extending downwardly from the inside walls 139 of the branch guides 136 are outwardly-curving chutes 140.

In the case of the chutes 140 the letters are deposited in the tray 133 of the stacker 132 shown in Figure 18 facing the reverse way from letters deposited into the tray 143 by branch guides 122 of Figure 16.

Figure 19:
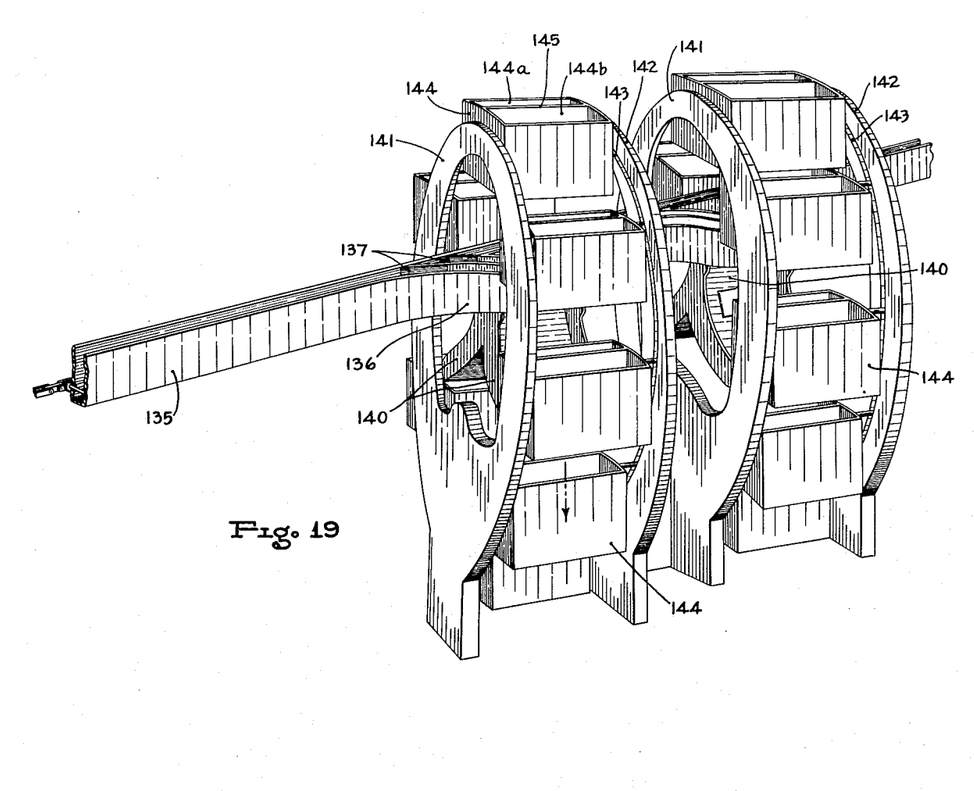

By the use of a multi-box type stacker as shown in Figure 19, one conveyor with, for example, sixteen outlets can be adapted to supply letters to a number of boxes far in excess of the number of outlets from the conveyor. For purposes of illustration, the conveyor 135 and its associated branch guides 136 of Figure 17 has been shown feedng a multi-box type stacker in Figure 19. Encircling the conveyor 135 and the branch guides 136 are two annular tracks 141 and 142 which are coaxial and axially spaced apart by a distance slightly greater than the width of the chutes 140. Within the tracks 141 and 142 are drive-chains 143 between which are pivotally suspended a plurality of boxes 144. The boxes 144 are divided into two halves 144a and 144b by a centre wall 145 extending substantially parallel to the axis of the circular tracks 141 and 142.

The spacing of the boxes 144 about the tracks 141 and 142 is such when one half 144a of a box 144 is in position to receive letters falling from a right hand chute 140, the other half 144b of another box 144 will be in position further around the tracks 141 and 142 to receive letters from the companion left-hand chute 140. By moving the chain 143 the boxes 144 may be revolved about the axis of the tracks 141 and 142, so that the then inwardly disposed halves of two further boxes 144 may be held adjacent the lower ends of the chutes 140.

If there are eight boxes 144 about the conveyor 135 at each point of division therefrom of a pair of branch guides 136, and, if there are eight pairs of branch guides 136, then, since each box 144 is divided into two halves 144a and 144b, there are available a total of 128 receptacles which can each be used at different times to represent at least two final destinations, thus giving in effect a sorter with at least 256 outlets.

When in use, letters may be sent through a conveyor 135 associated with the multi-box type stacker in a series of runs, the boxes 144 being rotated about the conveyor 135 so that a new pair of half-boxes 144a and 144b come opposite the chutes 140 after each run. The rotation of the boxes 144 may be affected by a series of motors controlled by the single switch which may be operated by a human operator at the end of each cycle of operation. The various half-boxes 144a and 144b may be emptied by hand as they pass above the conveyor. The gates 137 of the conveyor 135 may be operated by remote control in the manner previously described in connection with Figures 12 and 13 as may also the gates 121 of the conveyor 120 shown in Figure 16.

What I claim is:

1. A letter conveyor system comprising an elongated channel adapted slidably to support letters substantially in a given plane, an endless conveyor at least a part of a span of which extends along said channel adjacent thereto, means for driving said conveyor, pusher members secured to said conveyor at uniformly spaced intervals therealong, each of said pusher members extending wholly across the lower part of said channel at an angle to said given plane, a plurality of means for withdrawing letters from said channel disposed at stations spaced at intervals along said channel, information storage means, means for supplying said storage means with information indicative of the station along said channel at which a given letter is to be withdrawn, said storage means being adapted to operate the withdrawing means at the station corresponding to said information after a time delay determined in accordance with the position of said station along said channel and the rate of travel of said conveyor, in which said storage means comprises at least one actuator member pivotally mounted on the back of said conveyor opposite each of said pusher members for pivotal movement transversely of said conveyor, a plurality of elongated bearing surfaces rigidly mounted parallel and opposed to the back of said part of said conveyor span, said surfaces being disposed such that said actuator members may be pivoted into a position to rest on and slide along any one of said bearing surfaces, means sensitive to the presence of an actuator member disposed adjacent each of said surfaces opposite a separate withdrawing means, and means to direct each of said actuator members onto a given bearing surface in response to said information.

2. A letter conveyor system as claimed in claim 1 in which said means for directing said actuator members onto a given bearing surface comprises means for holding said actuator member in advance of said bearing surfaces, and gate means responsive to said information for pivoting said actuator member into sliding engagement with one of said bearing surfaces.

3. A letter conveyor system comprising an elongated channel adapted slidably to support letters substantially in a given plane, an endless conveyor at least a part of a span of which extends along said channel adjacent thereto, means for driving said conveyor, pusher members secured to said conveyor at uniformly spaced intervals therealong, each of said pusher members extending wholly across the lower part of said channel at an angle to said given plane, a plurality of means for withdrawing letters from said channel disposed at stations spaced at intervals along said channel, information storage means, means for supplying said storage means with information indicative of the station along said channel at which a given letter is to be withdrawn, said storage means being adapted to operate the withdrawing means at the station corresponding to said information after a time delay determined in accordance with the position of said station along said channel and the rate of travel of said conveyor, in which said storage means comprises at least one actuator member mounted to travel synchronously with the conveyor, a plurality of elongated guiding surfaces disposed such that said actuator members may be moved into a position to rest on and slide along any one of said guiding surfaces, means sensitive to the presence of an actuator member disposed adjacent each of said surfaces opposite a selected point, and means to direct each of said actuator members onto a given guiding surface in response to said information.

4. A conveyor system comprising an endless conveyor, means for driving said conveyor, a plurality of means for withdrawing articles from said conveyor disposed at stations spaced at intervals therealong, information storage means, means for supplying said storage means with information indicative of the station along said conveyor at which a given article is to be withdrawn, said storage means being adapted to operate the withdrawing means at the station corresponding to said information after a time delay determined in accordance with the position of said station along said conveyor and the rate of travel of said conveyor, including branch guide means associated with each of said withdrawing means, said stations being grouped in pairs along the length of said elongated channel and each said branch guiding means comprising two branch guide channels, a pair of chutes communicating each with one of said branch guide channels, and letter stacking means comprising two spaced tracks encircling said branch guide channels and said elongated channel, and a plurality of boxes freely suspended between and for movement along said tracks, said tracks being so positioned as to align said boxes successively with the outlet of one of said chutes.

References Cited in the file of this patent
UNITED STATES PATENTS

| | | |
|---|---|---|
| 1,246,358 | Trew | Nov. 13, 1917 |
| 1,442,126 | Cadden | Jan. 16, 1923 |
| 1,484,137 | Boiteaux | Feb. 19, 1924 |
| 1,916,801 | Knutsen | July 4, 1933 |
| 1,656,999 | Bull | Jan. 24, 1928 |